US008150958B2

(12) United States Patent
Karstens

(10) Patent No.: US 8,150,958 B2
(45) Date of Patent: Apr. 3, 2012

(54) METHODS, SYSTEMS AND COMPUTER PROGRAM PRODUCTS FOR DISSEMINATING STATUS INFORMATION TO USERS OF COMPUTER RESOURCES

(75) Inventor: Christopher Kent Karstens, Apex, NC (US)

(73) Assignee: International Business Machines Corporation, Armonk, NJ (US)

( * ) Notice: Subject to any disclaimer, the term of this patent is extended or adjusted under 35 U.S.C. 154(b) by 2680 days.

(21) Appl. No.: 10/839,473

(22) Filed: May 5, 2004

(65) Prior Publication Data

US 2005/0251571 A1    Nov. 10, 2005

(51) Int. Cl.
*G06F 15/16* (2006.01)
(52) U.S. Cl. .......................... 709/224; 709/239; 709/245
(58) Field of Classification Search .................. 709/224, 709/239, 245
See application file for complete search history.

(56) References Cited

U.S. PATENT DOCUMENTS

| | | | |
|---|---|---|---|
| 6,170,019 B1 * | 1/2001 | Dresel et al. .................. | 719/330 |
| 6,202,087 B1 * | 3/2001 | Gadish .......................... | 709/206 |
| 6,272,537 B1 * | 8/2001 | Kekic et al. ................... | 709/223 |
| 6,594,697 B1 * | 7/2003 | Praitis et al. .................. | 709/225 |
| 7,035,202 B2 * | 4/2006 | Callon .......................... | 370/216 |
| 2001/0049730 A1 * | 12/2001 | Brendes et al. ............... | 709/223 |
| 2002/0056053 A1 * | 5/2002 | Vine et al. .......................... | 714/4 |
| 2003/0140149 A1 * | 7/2003 | Marejka et al. ............... | 709/229 |
| 2003/0200266 A1 * | 10/2003 | Henry .......................... | 709/206 |
| 2004/0107261 A1 * | 6/2004 | Donzis et al. ................. | 709/207 |
| 2004/0139166 A1 * | 7/2004 | Collison ....................... | 709/207 |
| 2005/0135231 A1 * | 6/2005 | Bellovin ....................... | 370/216 |
| 2006/0168334 A1 * | 7/2006 | Potti et al. ..................... | 709/239 |

\* cited by examiner

*Primary Examiner* — Patrice Winder

(57) ABSTRACT

Embodiments of the present invention provide methods for disseminating status information to computer resource users. Pursuant to these methods, status information regarding a number of different computer resources is stored in a message store. The computer resources may be monitored to determine when one of them stops responding. An inbound message from a user that is addressed to the non-responding computer resource may then be routed to the message store using a network address translation operation, and at least some of the status information regarding the non-responding computer resource may be sent from the message store to the user. The status information sent from the message store to the user may include a notification that alerts the user that it is unnecessary to notify an administrator that the non-responding computer resource has stopped responding.

31 Claims, 5 Drawing Sheets

METHODS, SYSTEMS AND COMPUTER PROGRAM PRODUCTS FOR DISSEMINATING STATUS INFORMATION TO USERS OF COMPUTER RESOURCES

FIELD OF THE INVENTION

The present invention relates generally to computer resources and, more particularly, to disseminating status information to users of computer resources.

BACKGROUND OF THE INVENTION

Computer users frequently access computer application software programs and other computer resources that are not resident on their own computer. By way of example, a user might access software applications that are resident on a remote processing system within a network and/or connect to websites resident on remote servers via the Internet. When problems occur such that the remote computer resource (e.g., an application, the server on which one or more applications are running, etc.) stops responding or is slow to respond, users communicating with the remote computer resource may be provided little, if any, information regarding why the computer resource is no longer responding as expected. For instance, a user attempting to connect to a downed server may be provided the message "Connecting to server . . . " that remains on their computer screen for an extended period of time. After a time-out period has expired, the user may receive a message such as "Server not responding . . . " or "Can't find server . . . " The user may not receive any additional information regarding the failed connection attempt.

SUMMARY OF THE INVENTION

Embodiments of the present invention provide for disseminating resource status information to computer resource users. Status information regarding a number of different computer resources is stored in a message store. The computer resources may be monitored to determine when one of them stops responding. An inbound message from a user that is addressed to the non-responding computer resource may then be routed to the message store using a network address translation operation, and at least some of the status information regarding the non-responding computer resource may be sent from the message store to the user. The status information sent from the message store to the user may include a notification that alerts the user that it is unnecessary to notify an administrator that the non-responding computer resource has stopped responding.

The status information stored in the message store may be updated to reflect that one of the plurality of computer resources is scheduled to be taken off-line. The status information stored in the message store may be dynamically updated after determining that the computer resource has stopped responding. The status information stored in the message store may also be updated after learning that a non-responding computer resource has resumed responding, and the network address translation operation may thereafter be cancelled. Users may also be notified by the message store after the computer resource resumes responding. In embodiments of the present invention, the notification indicating that the computer resource has resumed responding may be sent to users who subscribe to receive such notification.

The status information stored in the message store may include, for example, information regarding when the non-responding computer resource stopped responding, why the non-responding computer resource stopped responding, when the non-responding computer resource is expected to resume responding and whether or not an appropriate system administrator has been notified. Moreover, the message store may store both current and future status information for one or more of the plurality of computer resources.

The determination of whether a computer resource has stopped responding may be accomplished in certain embodiments of the present invention by periodically polling the computer resources and determining that one or more of the computer resources has stopped responding if response(s) are not received to one or more of the periodic polls. The frequency at which a computer resource is polled may be dynamically modified after determining that the computer resource has stopped responding and/or learning that the computer resource is scheduled to be taken off-line in the future. In certain embodiments of the present invention, computer resources may directly notify the monitoring system when they are shutting down and/or restarting. In still other embodiments, a local "watchdog" may notify the monitoring system if it determines that a computer resource has crashed or stopped responding.

Pursuant to still further embodiments of the present invention, disseminating resource status information to users of non-responding computer resources is provided by a message store that stores status information regarding a plurality of computer resources, a monitoring system that identifies when respective ones of the plurality of computer resources stop responding, a router responsive to the monitoring system that routes messages from the users to the plurality of computer resources, and a network address translator that is coupled to the router that translates the network address of computer resources that have stopped responding to the network addresses and/or ports assigned to the message store. The message store may be implemented on a first processing system and the plurality of computer resources may be implemented on processing systems other than the first processing system. Alternatively, the message store may be implemented on one or more of the same data processing systems that include and/or contain the computer resources that are being monitored.

The message store may include a database of messages that are provided to users of non-responding computer resources. The message store may also include a plurality of agents that are configured to establish communications between the message store and users of non-responding computer resources. The monitoring system may communicate with the computer resources to determine when one or more of the computer resources are not responding, and it may also identify when non-responding computer resources resume responding.

As will further be appreciated by those of skill in the art, while described above primarily with reference to method and system aspects, the present invention may be embodied as methods, apparatus/systems and/or computer program products.

DETAILED DESCRIPTION OF THE INVENTION

Figure 1:
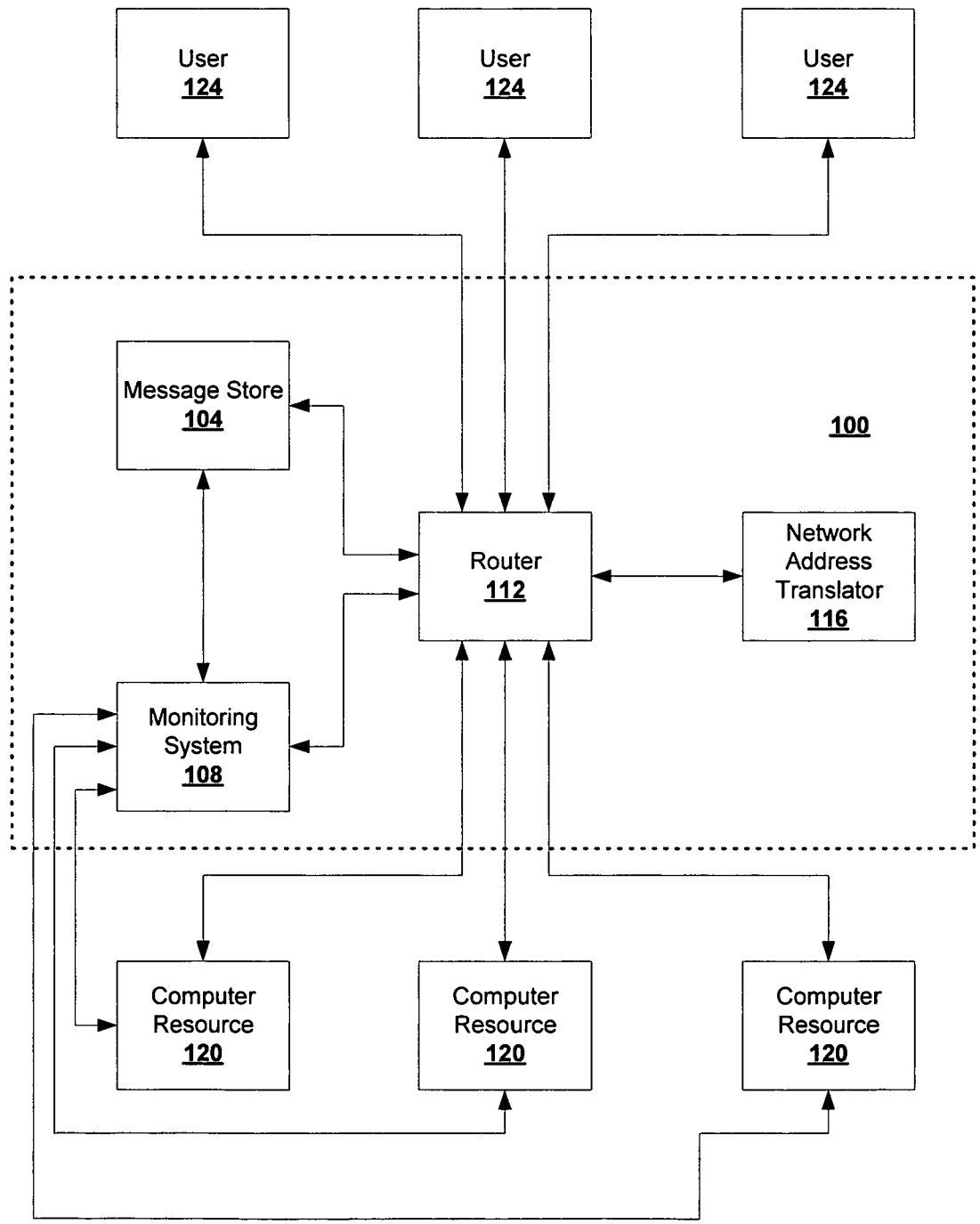
FIG. 1 is a block diagram of a system according to embodiments of the present invention.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely a single computer or on a plurality of different computers which may be located at a single location and/or at multiple remote locations. In the latter scenario, the remotely located computers may be connected to each other through a local area network (LAN) or a wide area network (WAN), or the connection may be made to an external computer (for example, through the Internet using an Internet Service Provider). In certain embodiments of the present invention that include a plurality of remotely located computers, some or all of the remotely located computers may not be interconnected.

The present invention is described in part below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Embodiments of the present invention provide for disseminating resource status information to computer resource users. As noted above, users of remote computer resources may not be provided any information regarding a non-responding computer resource other than the fact that it is not responding. As such, the user may have no idea why the resource is not responding (it may, for example, be a connection problem, a congestion problem, a problem with the remote computer resource, etc.). The user also is, typically, not provided any idea as to when the computer resource will resume responding, or whether this is an isolated or a routine occurrence. The user also, typically, does not know whether the administrator/operator, if any, of the remote computer resource has been notified of the problem. The methods, systems and computer program products of the present invention provide means for disseminating status information regarding non-responding computer resources to users of those resources.

Various embodiments of the present invention will now be described with reference to the figures. FIG. 1 illustrates a system 100 according to some embodiments of the present invention. As seen in FIG. 1, the status information dissemination system 100 includes a message store 104, a monitoring system 108, a router 112 and a network address translator 116. A plurality of computer resources 120 are provided that are used by one or more of a plurality of users 124. The computer resources 120 may, for example, be application software programs running on a server or other data processing system (e.g., Lotus Notes, Oracle, etc.), web sites, and/or computer hardware (e.g., a server that may be running a plurality of application programs or a custom firmware application). While in FIG. 1, only three computer resources 120 and three users 124 are depicted, it will be appreciated that the methods, systems and computer program products of the present invention can operate with other, for example, much larger, numbers of computer resources 120 and users 124.

As shown in FIG. 1, the users 124 may be interconnected with the computer resources 120 through at least one router 112. By "router" it is meant a hardware and/or software device that routes messages for at least part of their path through a network, specifically including hardware/software that is resident at or near the intended destination of the message (i.e., one of the computer resources 120) that can route the message elsewhere prior to actual delivery. The router may be stand alone device or may be part of a hardware and/or software system that also performs other functions, such as, for example, network access points or gateways. It will be appreciated that the router 112 may comprise a single device/system or a plurality of different devices and systems. The router 112 operates in conjunction with a network address translator 116. As will be appreciated by those of skill in the art, a network address translator refers to a hardware and/or software unit that translates a network address (e.g., the destination address) on a message being routed through a network to another network address, or otherwise operates to cause a message destined for one network address to be routed to a different network address. Typically, the network address translator 116 will be resident on the router 112 or may even be implemented as part of the router software. However, it will also be appreciated that the network address translator 116 may be resident on a device remote from the router 112. It will be appreciated that the network address translator 116 may also comprise a single device/system or a plurality of different devices and systems.

As is also shown in FIG. 1, the status information dissemination system 100 also includes a message store 104 and a monitoring system 108. The message store is a storage location for status information including, for example, predefined and/or dynamically generated status messages, regarding the computer resources 120 that are associated with the status information dissemination system 100. The message store may further include capabilities for generating and sending messages to users 124 of the computer resources 120. The message store 104 communicates with the monitoring system 108, although in some embodiments of the present invention the message store 104 may alternatively communicate directly with the computer resources 120 or through intermediate systems/resources other than the monitoring system 108. The monitoring system 108 communicates with at least some of (and typically all of) the computer resources 120. The monitoring system 108 monitors the computer resources 120 to at least identify instances when (1) a computer resource 120 stops responding and/or (2) when a non-responding computer resource 120 resumes responding. Either or both of the message store 104 and the monitoring system 108 may be configured to send messages to the users 124. This may be accomplished, for example, by the message store 104 and/or the monitoring system 108 sending messages to the users 124 via the router 112.

The embodiments of the invention depicted in the system 100 of FIG. 1 operate as follows. Various of the users 124 communicate with one or more of the computer resources 120 through the router 112. The monitoring system 108 monitors the computer resources 120. In certain embodiments of the present invention, the monitoring system 108 performs this monitoring function by periodically polling the computer resources 120. When one of the computer resources 120 fails to respond to one or more polls, the monitoring system 108 may conclude that the computer resource 120 has unexpectedly stopped properly responding. What constitutes a failure to respond to a poll may be defined in a variety of different ways depending upon the desired responsiveness, accuracy and other performance criteria specified for the system. In further embodiments of the present invention, the computer resources 120 may themselves notify the monitoring system 108 when they are shutting down or restarting. A local watchdog may also notify the monitoring system if it determines that a computer resource 120 has crashed or stopped responding. It will be appreciated by those of skill in the art that additional monitoring approaches are possible, and that the system may employ one or more approaches to performing the monitoring function.

Upon learning (e.g., after receiving a message from the monitoring system 108) that one of the computer resources 120 has stopped responding, the message store 104 may take steps to implement a network address translation that will divert inbound message traffic that is addressed to the non-responding computer resource 120 to the message store 104. In the embodiments of the present invention depicted in FIG. 1, the message store 104 may accomplish this by sending a control message to the router 112, and the router 112 and the network address translator 116 then implement the network address translation. It will be appreciated, however, that the message store 104 could accomplish this task in a variety of ways such as, for example, sending a control message requesting a network address translation directly to the network address translator 116. It will also be appreciated by those of skill in the art that in further embodiments of the present invention the monitoring system 108 or other components of the system could take the necessary steps to implement the network address translation.

The network address translation may be accomplished, for example, at the router 112 by mapping the internet protocol or "IP" address and/or the port address on the inbound message to the IP address and/or port address of the message store 104. Whether one or both of the IP address and port address are mapped may depend, for example, on the platform on which the computer resource 120 (when, for example, the computer resource is an application program) and the message store 104 are implemented. The network address translator 116 may perform the network address translation on the messages received at the router 112 that are addressed to the non-responding computer resource 120. In this manner, messages addressed to the non-responding computer resource 120 that are received at the router 112 after the network address translation has been implemented are routed to the message store 104 instead of to the non-responding computer resource 120.

In embodiments of the present invention, the message store 104 may contain a plurality of "agents." Each agent may be configured to communicate with users 124 who were attempting to communicate with a specific one of the computer resources 120. Thus, the agents may be configured to complete the "handshake" that occurs where one of the users 124 is attempting to establish communications with a specific one of the computer resources 120, using the handshake protocol that is defined for communications with that specific computer resource 120. In these embodiments of the present invention, for each message forwarded to the message store 104 via network address translation, an agent that is associated with the computer resource 120 to which the message is addressed processes the message. The message store 104 may also include a plurality of pre-stored messages. These messages may include both "pre-canned" messages that may be used when certain criteria are met as well as specific messages that have been provided by administrators of the computer resources 120 and/or by the computer resources 120 themselves and/or dynamically generated messages.

Upon receiving a message that was originally addressed to one of the computer resources 120 that has been diverted by network address translation implemented to the message store 104, the message store 104 may send a responsive message to the user 124 who sent the inbound message. The responsive message may, for example, be one of the pre-canned messages, one of the specific messages that are stored in the message store 104, and/or a dynamically generated message. By way of example, in the situation where the network address translation was performed because one of the computer resources 120 unexpectedly stopped responding, the message store 104 may have little or no information regarding why the computer resource stopped responding. In this situation, the message store 104 might send users 124 who were attempting to connect with the non-responding computer resource 120 a pre-canned message that advises the users 124 that the computer resource 120 had unexpectedly stopped responding and that the administrator of the non-responding computer resource 120 was being notified.

As noted above, the message store 104 may also be used to store and distribute messages regarding planned outages involving one or more of the computer resources 120. For instance, one of the computer resources 120 may periodically be taken off-line for scheduled maintenance and upgrades. In this situation, the administrator for that computer resource 120 can forward a message to the message store 104 that will be sent to any users 124 who attempt to connect with the computer resource 120 during the time the computer resource 120 is off-line for the scheduled maintenance. The administrator can enter or select the exact message that is to be sent to the users 124. An exemplary message might be:

Your Lotus Notes Mail server is currently off-line for previously scheduled maintenance and implementation of a planned upgrade. Notices regarding this planed outage were disseminated on July 3 and July 9. The Lotus Notes Mail server is scheduled to be back on-line by 4:00 pm today (and possibly earlier). Please do not contact the system administrator regarding this outage.

The message store 104 then sends out the administrator specified message to any users 124 who attempt to communicate with the computer resource 120 during the time that it is taken off-line for the scheduled maintenance.

When the non-responding computer resource 120 comes back on line, this change in condition may be identified by the monitoring system 108. This can be accomplished in many different ways, including, for example, having the computer resource 120 send a message to the monitoring system 108 when it comes back on line or by the monitoring system 108 polling the computer resource 120 and receiving a response to the poll. When the computer resource 120 comes back on line, the monitoring system 108 may take steps to undo the network address translation that is currently diverting inbound message traffic that is addressed to the previously non-responding computer resource 120 to the message store 104. The monitoring system may accomplish this, for example, by sending a control message to the router 112 and/or the network address translator 116 instructing the router 112 and network address translator 116 to cease performing the network address translation.

With planned outages, users may be notified well in advance of the outage by, for example, e-mail. Such an e-mail notification may be sent by the computer resource 120 that will have the planned outage, the message store 104, or other system or network components. At the time of the planned outage or thereafter the computer resource 120 and/or the message store 104 may send a shutdown notice to users of the computer resource 120.

Pursuant to embodiments of the present invention, users may also be notified when a computer resource 120 that suffered an outage (planned or otherwise) resumes responding. In certain embodiments of the present invention, this may be accomplished via a subscription service. For example, a particular user 124 may attempt to connect to a particular computer resource 120 during a time when the computer resource 120 is down for unknown reasons. In this situation, the message store 104 may send the user 124 a status message notifying the user 124 that the computer resource 120 is not responding. This status message may further include instructions regarding how to subscribe to receive a notification message when the computer resource 120 resumes responding. For instance, the status message could, for example, read:

The Lotus Notes server shutdown at 10:31 EST Feb. 2, 2004. The system administrator has been alerted. You can be notified when the server starts by subscribing to this resource at http://msgstore9.com.

The user 124 could click on the hyperlink or otherwise navigate to the identified website and subscribe to receive a notification message when the computer resource 120 resumes responding. The user 124 might also select from options regarding how she would be notified (e.g., e-mail, instant messaging, etc.) and/or the duration of the subscription (e.g., the next start only, starts and stops for 24 hours, a week, etc.). When the monitoring system 108 detects that the computer resource 120 has resumed responding, it notifies the message store 104 and the message store 104 may send out a notification message to all users subscribed to receive such notice.

In certain embodiments of the present invention, the monitoring system 108 may be a resource monitoring application such as one of the Tivoli applications provided by IBM Corporation. Such a resource monitoring application may not only identify situations when a computer resource 120 is not responding properly, but may, for example, additionally draw logical conclusions regarding the reason the computer resource 120 is not responding properly and estimate the time required to fix the problem, and, in some situations, may also act to automatically implement corrective actions. When these types of resource monitoring applications are used to implement the monitoring system 108, it may be possible to provide additional information to the message store 104 (and hence to users 124) when unexpected outages occur, for example, using dynamically created messages.

For example, the resource monitoring application may detect that the response time for a particular application 120 that is being monitored has reached unacceptable levels. Based on this information and information regarding other parameters of the application, the resource monitoring application may determine that a fatal error has occurred and that the application 120 must be rebooted. The resource monitoring application may at this point notify the message store 104 that an unplanned outage is about to occur, that the application 120 will be automatically rebooted, and that the reboot process is estimated to take approximately 3 minutes. The message store 104 may then arrange for the network address translation, and the monitoring system 108, for example, may reboot the application 120. As discussed in more detail below, the message store 104 can also send messages to the users 124 of the non-responding application 120 to provide them status information regarding the outage (e.g., that the outage has occurred, the expected duration of the outage, etc.). It will be appreciated by those of skill in the art that monitoring systems 108 that also include the capability to monitor more than just whether or not a computer resource 120 is responding may be able to provide a wide variety of enhanced status information to users 124 of non-responding computer resources 120.

It should also be noted that in some embodiments of the present invention, the message store 104 may not even be notified that a computer resource 120 has unexpectedly stopped responding. Instead, the message store 104 may just start receiving (via network address translation) messages that were originally addressed to one of the computer resources 120. Based on the receipt of these messages, the message store 104 may conclude that the computer resource 120 has unexpectedly stopped responding and send an appropriate pre-canned message to users 124 whose messages are network address translated to the message store 104.

Figure 2:
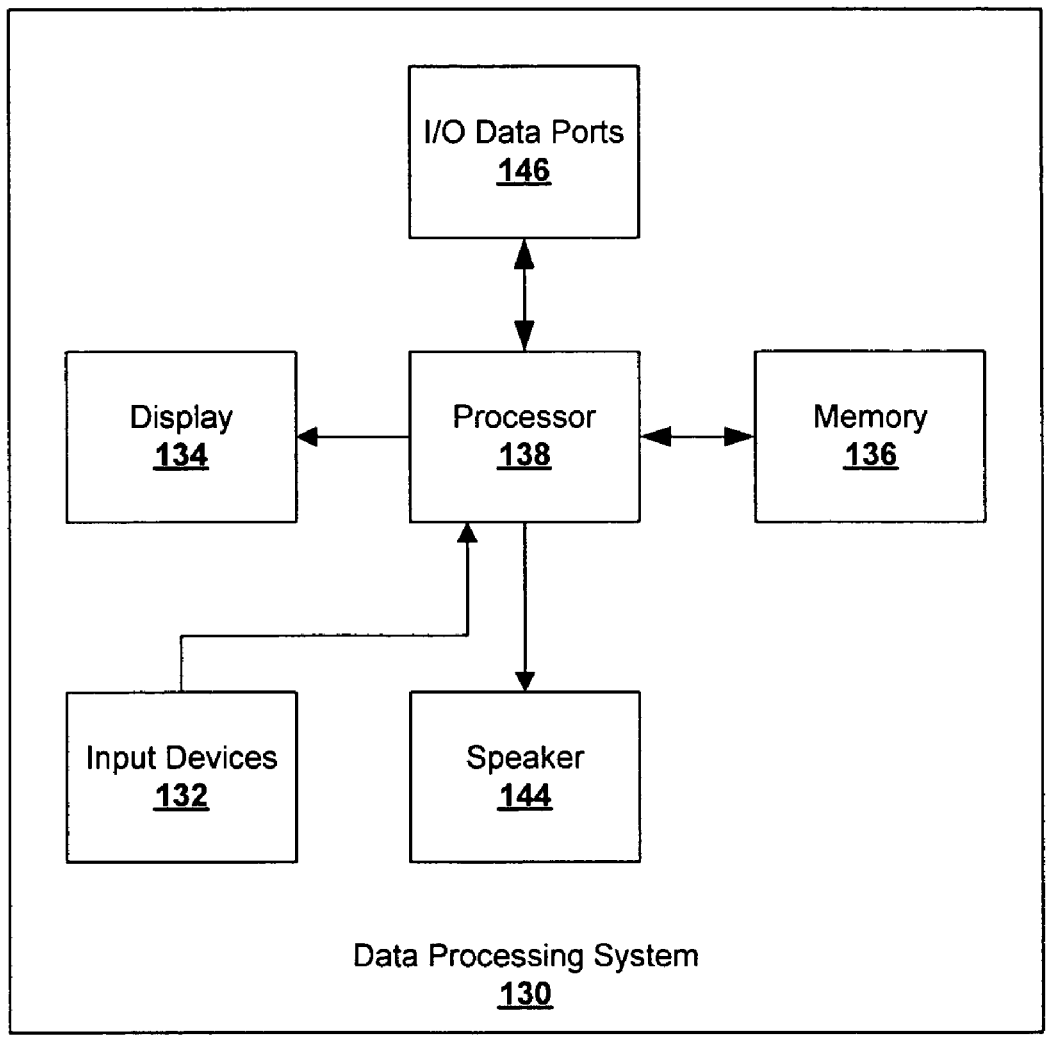
FIG. 2 is a block diagram of a data processing system suitable for use in embodiments of the present invention.

FIG. 2 illustrates an exemplary embodiment of a data processing system 130 that may be used in implementing one or more components (such as, for example, the monitoring system 108, the message store 104, the network address translator 116 and/or the router 112) of the status information dissemination systems in accordance with embodiments of the present invention. The data processing system 130 may include input device(s) 132 such as a keyboard, pointer, mouse and/or keypad, a display 134, and a memory 136 that communicate with a processor 138. The data processing system 130 may further include a speaker 144, and an I/O data port(s) 146 that also communicate with the processor 138. The I/O data ports 146 can be used to transfer information between the data processing system 130 and another computer system or a network. These components may be conventional components, such as those used in many conventional data processing systems, which may be configured to operate as described herein.

Figure 3:
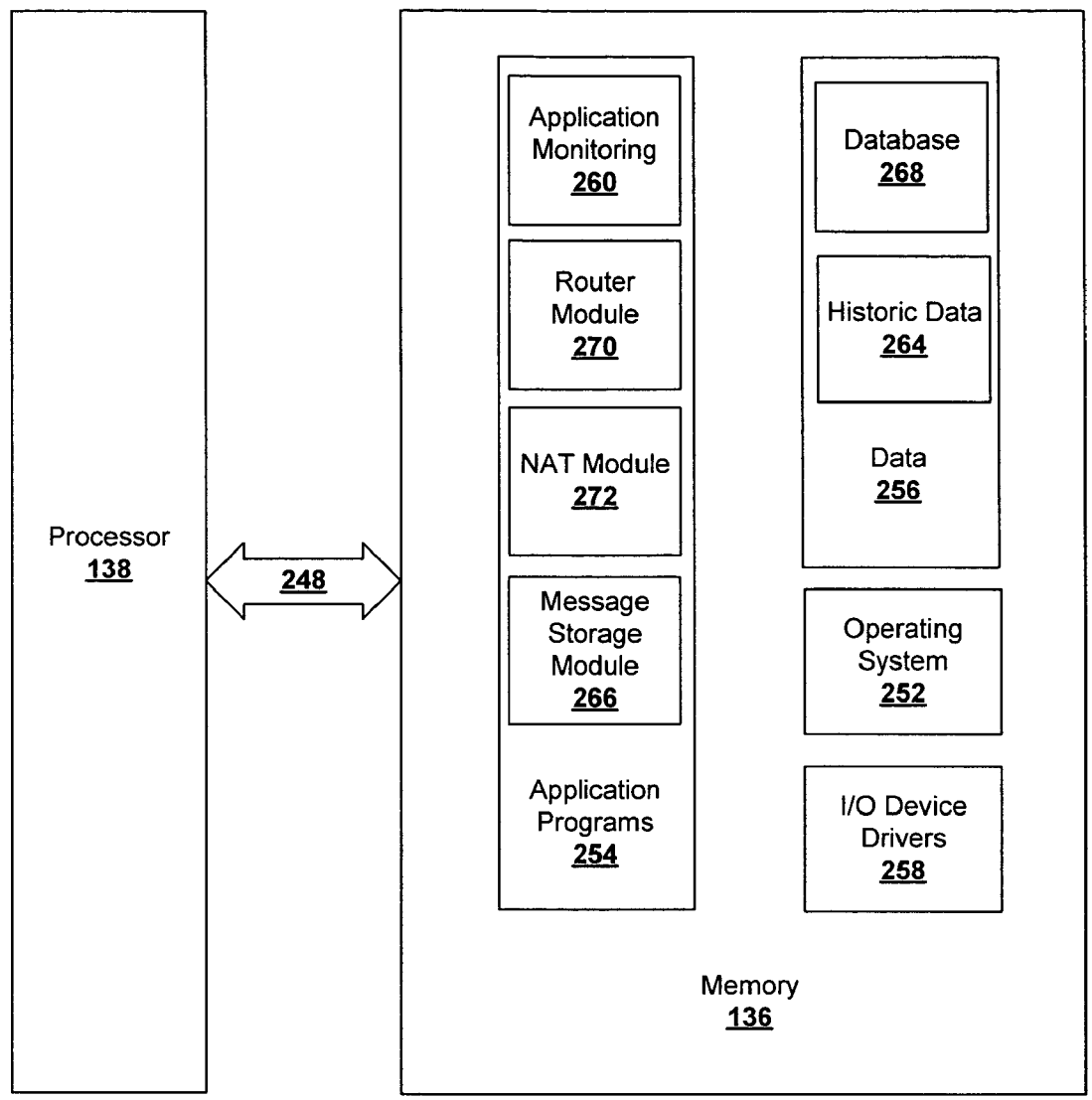
FIG. 3 is a more detailed block diagram of aspects of a data processing system that may be used in embodiments of the present invention.

FIG. 3 is a block diagram of data processing systems that illustrates systems, methods, and computer program products in accordance with embodiments of the present invention. The processor 138 communicates with the memory 136 via an address/data bus 248. The processor 138 can be any commercially available or custom microprocessor. The memory 136 is representative of the overall hierarchy of memory devices, and may contain the software and data used to implement the functionality of the data processing system 130. The memory 136 can include, but is not limited to, the following types of devices: cache, ROM, PROM, EPROM, EEPROM, flash memory, SRAM, and DRAM.

As shown in FIG. 3, the memory 136 may include several categories of software and data used in the data processing system 130: the operating system 252; the application programs 254; the input/output (I/O) device drivers 258; and the data 256. As will be appreciated by those of skill in the art, the operating system 252 may be any operating system suitable for use with a data processing system, such as OS/2, AIX, System390 or z/OS from International Business Machines Corporation, Armonk, N.Y., Windows95, Windows98, Windows2000 or WindowsXP from Microsoft Corporation, Redmond, Wash., Unix or Linux. The I/O device drivers 258 typically include software routines accessed through the operating system 252 by the application programs 254 to communicate with devices such as the I/O data port(s) 146 and certain memory 136 components. The application programs 254 are illustrative of the programs that implement the various features of the data processing system 130 and preferably include at least one application that supports operations according to embodiments of the present invention. Finally, the data 256 represents the static and dynamic data used by the application programs 254, the operating system 252, the I/O device drivers 258, and other software programs that may reside in the memory 136.

As is further seen in FIG. 3, the application programs 254 may include an application monitoring module 260. The application monitoring module 260 may carry out the operations described herein for the monitoring system 108 utilizing information obtained from the computer resources 120 and, in some instances, other information such as, for example, historic data 264 stored in the data 256 portion of memory. The application programs 254 may further include a message store module 266. The message store module 266 may carry out the operations described herein for the message store 104 utilizing a database 268 of information (such as, for example, stored messages) that is stored in the data portion of memory 256. The application programs 254 portion of the processing system 130 may further include a routing module 270 and/or a network address translation module 272, that perform the functions described above for the router 112 and the network address translator 116, respectively.

While the present invention is illustrated, for example, with reference to the modules 260, 266, 270, 272 being application programs in FIG. 3, as will be appreciated by those of skill in the art, other configurations may also be utilized. For example, one or more of the modules 260, 266, 270, 272 may also be incorporated into the operating system 252, the I/O device drivers 258 or other such logical division of the data processing system 130. It will also be appreciated that in many embodiments of the present invention one or more of the modules 260, 266, 270, 272 and/or the data sets 264, 268 will be implemented on separate processing systems 130. Thus, the present invention should not be construed as limited to the configuration of FIG. 3 but encompasses any configuration capable of carrying out the operations described herein.

Figure 4:
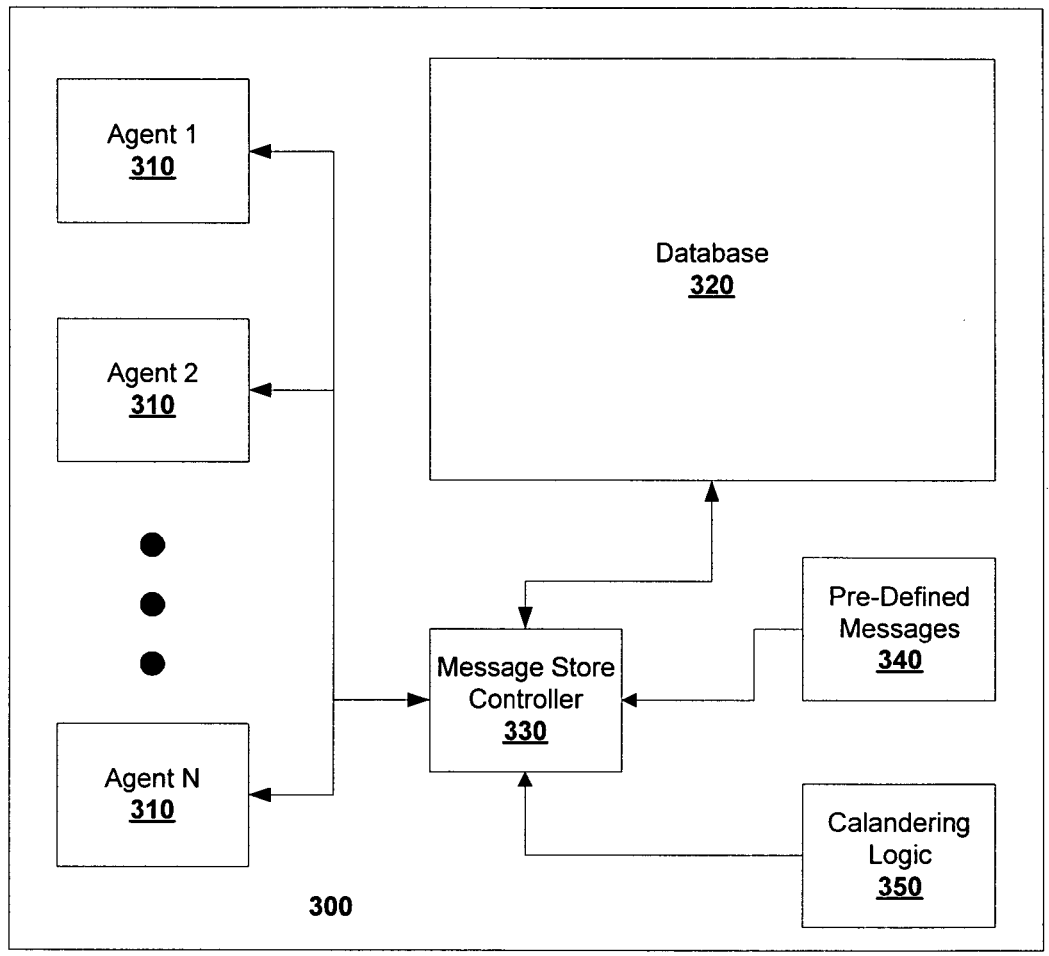
FIG. 4 is a block diagram of a message store according to embodiments of the present invention.

FIG. 4 is a block diagram illustrating components of a message store 300 according to embodiments of the present invention. Message store 300 may be used, for example, in the status information dissemination system 100 depicted in FIG. 1 and/or in the various modified versions of the status information dissemination system 100 described herein. As shown in FIG. 4, the message store 300 may include a plurality of agents 310, a database 320, a message store controller 330, pre-defined messages 340 and calendaring logic 350. The agents 310, the message store controller 330, and the calendaring logic 350 may, for example, comprise software applications and/or subroutines resident in memory on a data processing system that are run on the processor of the data processing system. The database 320 and/or the pre-defined messages 340 may, for example, be static and/or dynamic data sets stored in memory on a data processing system. The message store 300 of FIG. 4 may operate as follows.

The agents 310 receive messages that are forwarded via network address translation to the message store 300. The agents 310 are configured to establish communications with users who have sent messages to one or more computer resources 120 that the status information dissemination system is designed to work with. The agents 310 may be implemented as custom software applications that mimic the handshake procedures of the computer resources 120 that they are associated with (i.e., the computer resource(s) 120 that were the intended recipients of the messages received by the agent). Upon receiving a message, an agent 310 may (1) proceed to complete the handshake procedures required to establish communications with the user 124 who sent the message and (2) forward the received message to the message store controller 330. The agents 310 can be associated with a single computer resource 120 or with multiple computer resources 120.

Upon receiving a message from one of the agents 310, the message store controller 330 may conclude that one of the computer resources 120 is no longer responding. The message store 300 may or may not have previously been notified that the computer resource 120 was no longer responding. The message store controller 330 may use the calendaring logic 350 to determine if there are any "active" messages stored in the database 320 regarding the non-responding computer resource 120. If the database 320 contains one or more "active" messages relating to the non-responding computer resource 120, the message store 300 sends the message(s) to the user 124 via an appropriate agent 310.

As shown in FIG. 4, the message store 300 may also include a set of pre-defined messages 340. In embodiments of the present invention, these pre-defined messages 340 may be, for example, sent to users 124 in situations where one of the computer resources 120 unexpectedly stops responding. When such an unexpected outage of one of the computer resources 120 occurs, the message store 300 typically will not have in the database 320 a message that is specifically aimed at this particular outage (since the outage was "unexpected"), and thus one of the pre-defined messages 340 may be used. The pre-defined messages may include messages that are only used with specific computer resources 120 and/or general messages that may be used whenever one of the computer resources 120 unexpectedly stops responding.

As noted above, in embodiments of the present invention calendaring logic 350 is provided that may be used to determine if any messages stored in the database 320 are "active." An "active" message refers to a message that should be displayed when and if the computer resource(s) 120 with which the message is associated stops responding. The calendaring logic 350 may accomplish this, for example, by associating a start time and a stop time with each message stored in the database 320. The calendaring logic 350 may extract the time stamp and the original destination address (i.e., the address of the computer resource 120 that the message was originally addressed to) on a message that is received by one of the agents 310. Using this information, the calendaring logic 350 may execute a look-up operation in the database 320 to see if the time stamp falls between the start time and the stop time of any of the messages stored in the database 320 that relate to the computer resource 120 that the message was originally addressed to. If so, such identified messages may be deemed "active" messages such that they are forwarded to the user 124 who sent the received message. If no "active" messages are identified, the message store controller 320 may select an appropriate pre-defined message to send to the user 124. In embodiments of the present invention, both messages from the database 320 and pre-defined messages 340 may be sent to the user 124.

The calendaring logic 350 may also be used to delete "expired" messages. This may be done, for example, by periodically searching the database 320 to identify messages having a stop time that has already passed and deleting those messages from the database 320.

Figure 5:
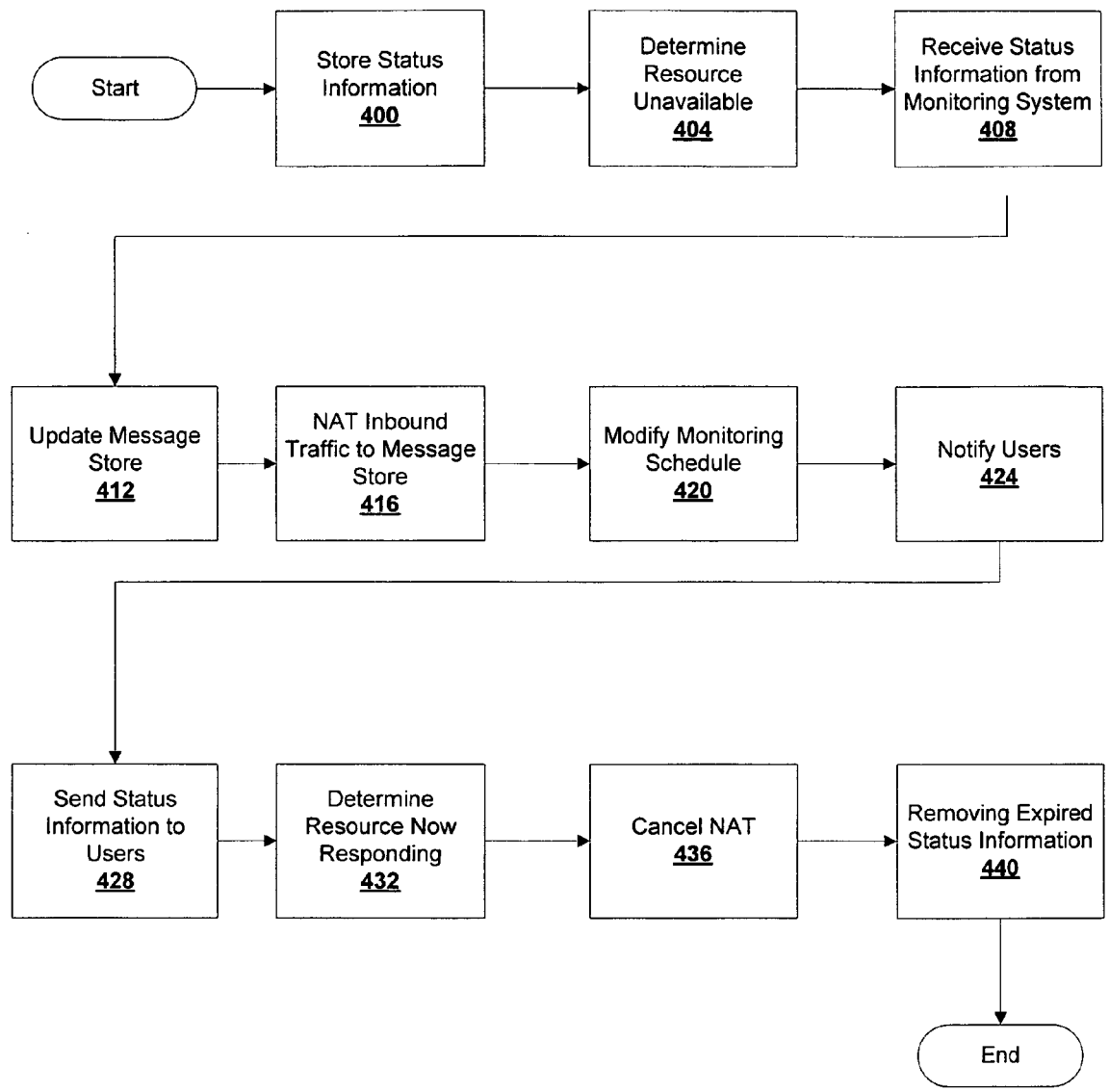
FIG. 5 is a flow chart depicting operations according to embodiments of the present invention.

FIG. 5 is a flow chart diagram depicting operations that may be carried out pursuant to embodiments of the present invention. As shown in FIG. 5, operations may start with the storage of status information in the message store (block 400). The information stored in the message store may be, for example, pre-canned messages and/or messages relating to specific scheduled outages for computer resources that are monitored by the status information dissemination system. Next, a determination may be made that one of the applications is no longer responding (block 404). As discussed above, this may be conveniently accomplished by, for example, using a monitoring system to poll the computer resources. At various points in time after the message store is established, the message store may be provided with additional status information regarding one or more of the computer resources (block 408). Upon receiving this information it may be stored in memory or in some other storage mechanism at the message store (block 412).

Once it is determined that one of the computer resources is no longer responding, inbound traffic to the non-responding computer resource may be forwarded to the message store via network address translation (block 416). Optionally, the schedule for monitoring the non-responding computer resource may be modified at this time (block 420). For instance, in situations in which the computer resource is not responding because of a scheduled outage, the computer resource may be monitored less frequently (or even not at all) during all or part of the scheduled time for the outage. On the other hand, in situations in which the outage is unexpected, the computer resource may be monitored more often so that the network address translation may be turned-off as soon as possible after the computer resource resumes responding.

When status information regarding a scheduled outage is provided to the message store, the status information dissemination system may optionally broadcast advance warning of the outage to some or all of the users of the computer resource that is scheduled to go-off line. This early warning could be sent out, for example, via e-mail. The administrator for the computer resource could provide the language for this message or a pre-canned message resident at the message store could be used. A variety of criteria could be used to determine which users receive such a notification message; for example, it could be sent to a list of users provided by the administrator for the computer resource or, alternatively, could be based on information resident at the router, the monitoring system and/or the message store regarding which users have previously sent messages to the computer resource that has a scheduled outage. Pursuant to further embodiments of the present invention, users could subscribe to be notified that a computer resource 120 is going offline regardless of whether or not the outage was planned or unplanned. The notification could be sent to subscribed users regardless of whether or not they are running an application resident on the computer resource 120 at the time of the outage.

After the message store 104 starts receiving messages that have been diverted from the non-responding computer resource to the message store 104 using network address translation, reply messages are sent to each such user providing status information regarding the non-responding computer resource (block 428). Eventually, the computer resource may resume responding, and at some point after it comes back on line the message store 104 realizes that the resource is again responding (block 432). After this occurs, the network address translation for this resource is removed (block 436). Thereafter, expired messages may be removed from the message store (block 440).

It should be noted that, for the reply messages to be effective, the users have to be ready to receive messages from the message store 104. For example, assume that a user has issued a database "get row" command to the computer resource 120 that has now stopped responding. In some cases, the command may permit a response from the message store, while in other situations it may not. If such a response is not permitted, a message store "listener" could run on a different port of the users station. The database get row command is diverted to the message store 104, and the message store could send the reply message to the message store listener running on the user's station. Then the user and/or the station could (automatically or manually) cancel/terminate the get row command based on the response from the message store 104.

According to further embodiments of the present invention, the network address translator 116, the router 112, the message store 104 and/or the monitoring system 108 may be implemented as a distributed system in which, for example, a separate network address translator 116, router 112 and/or a separate monitoring system 108 is provided locally (either on the same hardware or on hardware located in the same location) at many or all of the computer resources 120 that are to be monitored. Thus, for example if a particular application (e.g., Lotus Notes) that is being monitored stops responding, a monitoring system that may be running on the same platform will detect the outage and the network address translation may be applied locally as messages sent to Lotus Notes arrive at the platform (i.e., the router 112 of FIG. 1 may be viewed as a distributed router that is provided at each of the computer resources that are to be monitored). In these embodiments, the message store 104 may also be implemented as a distributed message store (i.e., a separate message store is provided on each of the platforms) or as a centralized message store that stores messages relating to all of the computer resources that are being monitored.

The flowchart and block diagrams of FIGS. 1 through 5 illustrate the architecture, functionality, and operations of some embodiments of methods, systems, and computer program products for disseminating status information to users of computer resources. In this regard, each block represents a module, segment, or portion of code, which comprises one or more executable instructions for implementing the specified logical function(s). It should also be noted that in other implementations, the function(s) noted in the blocks may occur out of the order noted in the figures. For example, two blocks shown in succession may, in fact, be executed substantially concurrently or the blocks may sometimes be executed in the reverse order, depending on the functionality involved.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A method of disseminating computer resource status information, the method comprising:
   storing status information regarding a plurality of computer resources in a message store;
   determining that one of the plurality of computer resources has stopped responding;
   routing a message from a user that is addressed to the non-responding computer resource to the message store using a network address translation operation; and
   sending, responsive to receiving the message at the message store, at least some of the status information regarding the non-responding computer resource from the message store to the user.

2. The method of claim 1, further comprising updating the status information stored in the message store to reflect that one of the plurality of computer resources is scheduled to be taken off-line.

3. The method of claim 1, further comprising dynamically updating the status information stored in the message store after determining that the one of the plurality of computer resources has stopped responding.

4. The method of claim 1, further comprising updating the status information stored in the message store after a non-responding computer resource resumes responding.

5. The method of claim 1, further comprising canceling the network address translation operation after a non-responding computer resource resumes responding.

6. The method of claim 1, wherein the plurality of computer resources and the message store are implemented on different processing systems.

7. The method of claim 1, wherein the status information includes information regarding when the non-responding computer resource stopped responding.

8. The method of claim 1, wherein the status information includes information regarding when the non-responding computer resource is expected to resume responding.

9. The method of claim 1, wherein the status information includes information regarding the reason the non-responding computer resource stopped responding.

10. The method of claim 1, wherein the message store stores both current and future status information for one or more of the plurality of computer resources, and wherein sending at least some of the status information regarding the non-responding computer resource from the message store to the user comprises sending current status information regarding the non-responding computer resource from the message store to the user.

11. The method of claim 2, further comprising sending a notification message from the message store to at least one user of the one of the plurality of computer resources that is scheduled to be taken off-line notifying the at least one user that the one of the plurality of computer resources is scheduled to be taken off-line.

12. The method of claim 11, wherein the at least one user has subscribed to receive notification messages from the message store.

13. The method of claim 11, wherein the notification message is sent to the at least one user of the one of the plurality of computer resources that is scheduled to be taken off-line regardless of whether the user was running an application on the one of the plurality of computer resources that is scheduled to be taken off-line.

14. The method of claim 1, wherein the status information sent from the message store to the user includes a notification that alerts the user that it is unnecessary to notify an administrator that the non-responding computer resource has stopped responding.

15. The method of claim 1, wherein determining that one of the plurality of computer resource has stopped responding comprises receiving a notification message from the one of the plurality of computer resources or from a local monitoring system that indicates that one of the plurality of computer resource has stopped responding.

16. The method of claim 1, wherein determining that one of the plurality of computer resource has stopped responding comprises:
   periodically polling the one of the plurality of computer resources to determine if it is responding; and
   determining that the one of the plurality of computer resources has stopped responding if a response is not received to one or more of the periodic polls.

17. The method of claim 16, further comprising modifying the frequency at which the one of the plurality of computer resources is polled after determining that the one of the plurality of computer resources has stopped responding.

18. The method of claim 16, further comprising:
   learning that the one of the plurality of computer resources is scheduled to be taken off-line; and
   modifying the frequency at which the one of the plurality of computer resources is polled for at least part of a time period for which the one of the plurality of computer resources is scheduled to be off-line.

19. The method of claim 1, further comprising removing status information stored in the message store after a time stamp associated with the status information has expired.

20. A system for disseminating resource status information to users of non-responding computer resources, comprising:
   a message store having one or more associated network addresses that stores status information regarding a plurality of computer resources that have network addresses that are different than the one or more network addresses associated with the message store;
   a monitoring system that includes a processor that is configured to identify when respective ones of the plurality of computer resources stop responding;
   a router responsive to the monitoring system that routes messages from users to the plurality of computer resources, wherein the router is configured to route a message from a user that is addressed to a non-responding computer resource to the message store using a network address translation operation; and
   a network address translator coupled to the router that translates the network addresses of respective ones of the plurality of computer resources that stop responding, wherein the message store is configured to send, responsive to receiving the message at the message store, at least some status information regarding the non-responding computer resource to the user.

21. The system of claim 20, wherein the monitoring system further identifies when respective ones of the plurality of computer resources resume responding.

22. The system of claim 20, wherein the network address translator further cancels the network address translation of the respective ones of the plurality of computer resources that had stopped responding once the respective ones of the plurality of computer resources resume responding.

23. The system of claim 20, wherein the message store includes a database of messages that are provided to users of the non-responding computer resources.

24. The system of claim 23, wherein the message store further includes a plurality of agents, wherein each agent is configured to establish communications between the message store and users of one or more of the plurality of computer resources.

25. The system of claim 20, wherein the monitoring system communicates with the plurality of computer resources to determine when one or more of the plurality of computer resources are not responding.

26. The system of claim 20, wherein the message store is implemented on a first processing system and the plurality of computer resources are implemented on processing systems other than the first processing system.

27. The system of claim 20, wherein the message store includes status information regarding when the non-responding computer resource stopped responding.

28. The system of claim 20, wherein the message store includes status information regarding when the non-responding computer resource is expected to resume responding.

29. The system of claim 20, wherein the message store includes status information regarding the reason the non-responding computer resource stopped responding.

30. The system of claim 20, wherein in at least some instances the monitoring system estimates the duration for which a non-responding computer resource will not respond.

31. A computer program product for disseminating resource status information to computer resource users, the computer program product comprising:
   a computer readable storage medium having computer readable program code embodied therein, the computer readable program code comprising:
   computer readable program code configured to store status information regarding a plurality of computer resources in a message store;
   computer readable program code configured to determine that one of the plurality of computer resources has stopped responding;
   computer readable program code configured to route an inbound message from a user that is addressed to the non-responding computer resource to the message store using a network address translation operation; and
   computer readable program code configured to send, responsive to receiving the message at the message store, at least some of the status information regarding the non-responding computer resource from the message store to the user.

* * * * *